Sept. 17, 1968  H. A. MATHEWS  3,401,830
VENDING MACHINE FOR CREDIT CARD PURCHASING
Filed Jan. 19, 1967  2 Sheets-Sheet 2
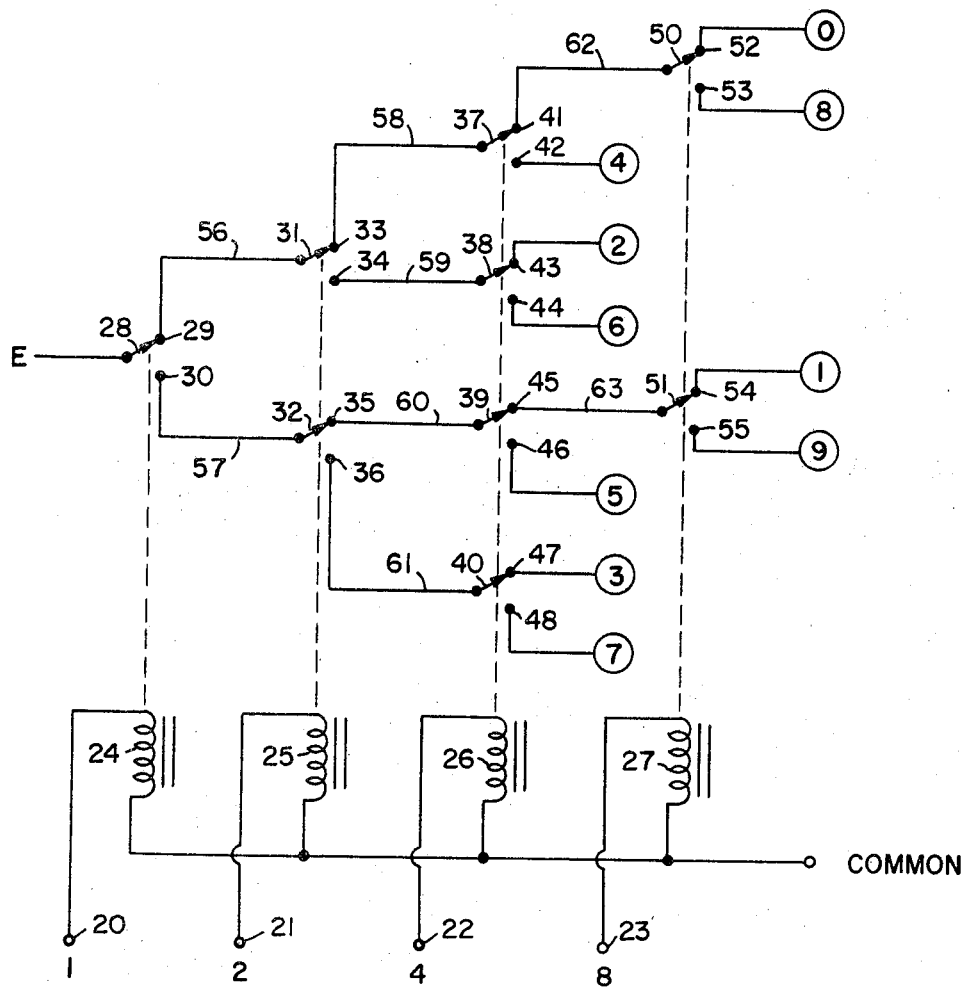
DECODING RELAY MATRIX  4 BIT BINARY TO DECIMAL
FIG_2
INVENTOR.
HARRY A. MATHEWS
BY
Owen, Wickersham & Erickson
ATTORNEYS United States Patent Office 3,401,830
Patented Sept. 17, 1968

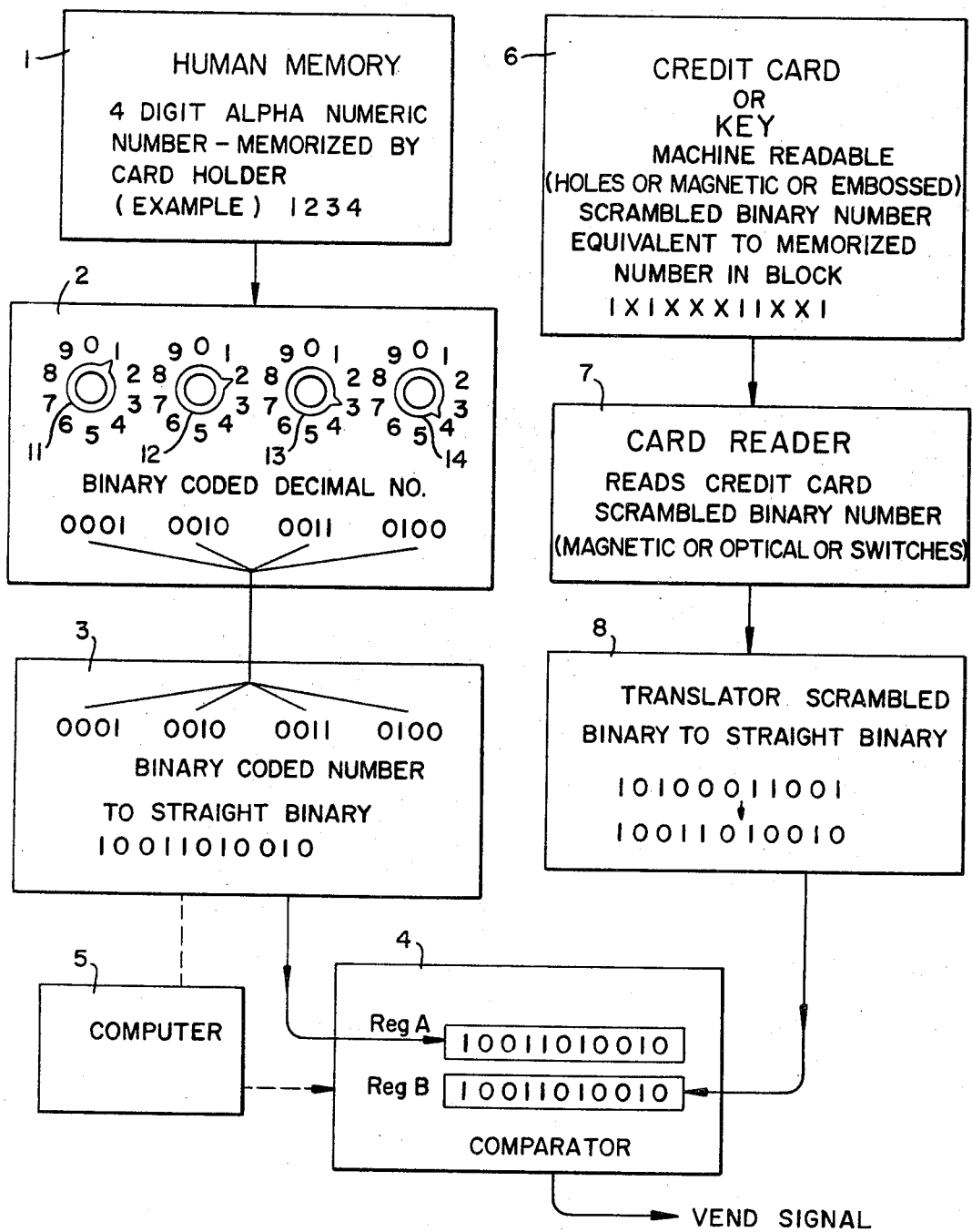
FIG_1

3,401,830
VENDING MACHINE FOR CREDIT
CARD PURCHASING
Harry A. Mathews, Walnut Creek, Calif., assignor to San
Francisco Bay Area Rapid Transit District, San Francisco, Calif., a rapid transit district of California
Filed Jan. 19, 1967, Ser. No. 610,256
10 Claims. (Cl. 221—2)

ABSTRACT OF THE DISCLOSURE

A vending machine for credit-card purchasing. The credit card has a scrambled or otherwise non-visually-decipherable code number, and the machine reads and unscrambles that code number. The user also manually introduces into the machine a memorized second code number, which may be identical to the first one or having some relationship to it. The machine compares said first and second code numbers and enables delivery of an article from said machine when said code numbers coincide or correspond, the machine also records billing confirmation from the credit card. A thirty-two digit system with five binary bits for each digit place thereof is preferably used for the code numbers.

---

This invention relates to improvements in vending machines and in mechanical credit methods. More particularly, it provides for credit-card purchasing from vending machines while giving the credit-card owner protection against consequences of losing his credit card and having someone else gain its possession.

For some years this country has seen a trend toward credit purchasing using a personalized credit card. Heretofore, in all such cases the transaction has taken place between two persons, the card being presented in the same manner as one would present cash for a purchase, except that someone verified somewhat the validity of the account and prepared a format for a monthly billing rather than making change.

This prior-art system did not lend itself to vending-machine purchasing, because even though a vending machine under computer control could be made to recognize valid machine-readable credit card numbers and to dispense record transactions, there was no provision for card security in the event that the card were stolen or lost.

The present invention overcomes this limitation to the extent that the credit card owner and the vending-machine operator are assured reasonable security against mass theft without a human interface between credit card and vending machine. Thereby, the invention provides practical credit purchasing from vending machines.

Ordinarily, if a credit card were to fall into the hands of a dishonest person, he could make many purchases against the owner's account before the owner discovered the loss and took the necessary steps to have that particular card invalidated. If the vending machines were under the control of a suitable computer, a reported loss could be programmed to cause the vending machines to reject that particular card by checking and verifying the credit card number; however, an illegal card holder could still make many purchases before the card loss was discovered and reported. If, for example, such a credit card had a transaction limitation of $20.00 for the purchase of articles out of a vending machine, it would be possible for a theft of many thousands of dollars in merchandise to occur before the system would be programmed to check the card number.

Thus, an object of the invention is to provide a safe self-service credit system—a system wherein vending machines can safely be operated by credit cards.

Another object is to protect a credit-card holder against financial loss when he loses a credit card, whether or not he knows his credit card is missing and reports his loss.

A further object is to enable large numbers of people to purchase by credit cards from many vending machines while retaining security and simplicity in the way the credit cards are used.

The vending machine of this invention is used in association with a credit card having a scrambled or otherwise nonvisually-decipherable first code number thereon. The machine itself includes means for reading and unscrambling the credit card's code number, means for the user manually to introduce a memorized second code number into the machine, means for comparing the two code numbers and enable delivery of an article from the machine when the code numbers coincide or correspond, and means for recording billing confirmation from the credit card.

Other objects and advantages of the invention will appear from the following description of some preferred forms thereof.

In the drawings:

FIG. 1 is a block diagram of a system of this invention.

FIG. 2 is a circuit diagram of a typical decoding relay matrix.

The system of this invention enables the credit-card owner to depend on his memory as part of a security system. When each credit card is issued, a code number is also issued, and the card owner is instructed to memorize that code number. The code number is somewhat analogous to the combination for a padlock. It may comprise numerals or letters, or a combination of alpha numeric characters such as—for example 6CL5. It may be purely arbitrary, or if desired, it may in some way be referenced to the owner's phone number, street address, or social security number for easier remembering. This number is also contained on the credit card in a form unintelligible to any person but readable by a machine. The machine-readable code on the credit card may comprise magnetic bits, punched holes, embossing or other such existing techniques. Each time a purchase is made, the card owner enters his memorized code number into the vending machine by setting dials, pushing buttons, or other means, and also inserts his credit card into a slot. The vending machine reads and decodes the number on the card, and compares it with the number entered from the card owner's memory. If the two numbers are identical, the vending machine concludes that the purchaser is a proper holder of the credit card, and the transaction is permitted. Otherwise, the machine refuses to make the transaction.

A specific example is given in the block diagram of FIG. 1. In this example, a simple four-digit numeral 1234 is the card-holder's code number; as indicated in block 1, the code number is stored invisibly in the customer's memory. When the customer uses a vending or dispensing machine, he enters his code number 1234 into the machine, as by setting each of the four selector switches 11, 12, 13, and 14 to the proper digit, as shown in block 2. The selector switches 11, 12, 13, and 14 are so wired in accordance with well-known circuitry that each translates its decimal value into its binary-coded decimal equivalent, and through parallel transmission sets the resulting binary-coded decimal number into a register 3. At the register 3, the binary-coded decimal number is translated by other well-known standard circuitry to a straight binary number, which is transmitted to a comparator register 4. It may here be noted that when the vending machine is under control of a computer, the binary-coded decimal number of block 3 is first transmitted to a computer 5, which is programmed to do the translation to straight binary. However, the vending machine may contain its independent program logic and circuitry, or its own translation network to prepare the straight binary number to be entered in the comparator register 4.

Block 6 represents the credit card itself. The term credit card (as used herein) means any machine-readable device that may be carried by a user for the purpose of making a purchase, so long as it must be capable of storing a permanent machine-readable code which a reading device on the machine can identify. For purposes of illustration, the card may be a plastic card with raised bars for the 1's in a binary-coded number and blank spaces for the 0's. The 1's and 0's could instead be punched holes for 1's, and absence of punching for the 0's, or may instead be notches and no-notches along an edge, or may be magnetic and non-magnetic bits coated on or imbedded in a plastic or cardboard or paper card. The credit card 6 may instead be in the form of a key on which high indents represent 1's and low indents represent 0's. Preferably the code number is scrambled—especially if its indicia are visible.

The customer, having set up his code number on the dials 11, 12, 13, and 14, inserts his credit card 6 in a sensing device 7 which is capable of reading the code on the credit card 6. The sensing device 7 may have a single sensor and read the code serially one bit at a time against a time base and shift the message into a register, or it may have a plurality of sensors and read the entire message simultaneously, having a sensor for each bit position. Either way, the message is scrambled, if it is scrambled on the card. If the message is read serially, cross wiring 8 presents the masseage from the device 7 in parallel to the comparator unit 4. If the message bits are read simultaneously, the reading sensors 7 may be merely cross wired to unscramble the message, and to transmit it in parallel directly to the comparator 4.

The comparator 4 may be an electronic assembly of registers and logic for comparing the two binary numbers presented respectively by the register 3 and the sensing device 7. Each register must have a bit capacity equal to the maximum number of bits in the code number. When the electronic logic detects that the contents of the two registers are equal, then and only then is a signal to dispense given.

Many codes and combinations may be used to obtain credit card security, and the choice depends upon the number of different account numbers and the degree of security required. As an illustration, a 32-digit numbering system accommodates more than one million different accounts. By adopting a numbering system with 32 digits (including, for example, digits 0 through 9 and the alphabet from A to V), one can represent a number, or count to 1,048,605. Such four-character numbers as 6–8–G–O or W–5–7–T or 9–H–H–H, are, for example, what various card owners would memorize, i.e., his code number. To the owner it may have no numerical significance; he is aware only that when he properly enters his code number into a vending machine and also presents his credit card to the machine, he can make a purchase and it will be charged to his account.

An ordinary four-digit decimal number limits the number of different code numbers to 9999; a five-digit decimal number would allow only 99999 possible code numbers, and six digits enable 999,999, and so forth. However, the more digits contained in the address, the more difficult it becomes to memorize, and more complex and costly is the process required to translate the address to straight binary form for comparison. This is why I recommend adopting a 32-digit numbering system. For illustration, the highest 4-digit decimal number 9999 can also be written as:

$$9 \times 10^3 + 9 \times 10^2 + 9 \times 10^1 + 9 \times 10^0$$

or $$9000 + 900 + 90 + 9 = 9999$$

Likewise the highest 4-digit 32-base alpha numeric number VVVV can also be written as:

$$V \times 32^3 + V \times 32^2 + V \times 32^1 + V \times 32^0$$

V being equal to 31, the decimal number equivalent is:

$$31 \times 32^3 + 31 \times 32^2 + 31 \times 32^1 + 31 \times 32^0$$

or $$1{,}015{,}808 + 31{,}744 + 992 + 31 = 1{,}048{,}605$$

Thus, the 4-digit 32-base alpha numeric number offers approximately 100 times more individual credit card code numbers than a 4-digit decimal number; still the owner need only memorize a code number of 4 digits. The 4-digit 32-base number also is convenient, because each digit can be translated into a 5-bit binary number for computer manipulation. Any base higher than 32 would require more than 5 binary digits.

The vending machine decodes and translates this alpha-numeric combination into a 20-bit binary number, which it stores in a register within the machine. This same 20-bit binary number also exists in permanent machine readable form on the credit card preferably scrambled in such a way that an expert would experience great difficulty in interpreting its significance, even if he could see each individual bit. The vending machine is so wired (as stated) that each binary bit appears in its proper binary order when the card is read. If this number matches the decoder and translated number in the register, the transaction is valid.

A numbering system such as this is expandable to many millions of account numbers, considering that the same number could be issued and used simultaneously by many different people by adding a machine-readable account-identification code to the credit card. Also, inactive accounts may be screened out by re-issuing all new cards every year, thereby minimizing the demand for excessive card numbers. All these possibilities, coupled with the possibilities of using odd and scrambled codes, indicate that an extremely reliable and secure system can be devised for credit card purchasing from vending machines.

The entry device 2 for setting the memorized code number into a machine was shown as four rotary selector switches 11, 12, 13, and 14. A four-digit decimal code number requires ten positions for setting the digits 0 through 9, and has necessary switch contacts to translate each digit to its 4-bit binary coded decimal equivalent. A 4-digit 32-base address using characters 0 through 9 and A through V requires 32-position switches with the necessary contacts to translate to a 5-bit binary coded number. The entry device 2 may be a set of pushbutton switches, a telephone-type entry dial, or any such device capable of translating each digit on the memorized code number to its binary coded equivalent.

The translator 3 for converting the binary-coded decimal or alpha-numeric number to straight binary is a known device. Depending on the complexity of the translation, which is a function of the numbering system used for assigning the memorized code numbers, the translation may be done electromechanically with relays, a solid-state translator matrix, or by computer program. A simple relay circuit for translating a 4-bit binary number to a decimal digit is shown in FIG. 2, to illustrate the feasibility of an electro-mechanical translation.

The four binary inputs, 20, 21, 22, and 23 for the numbers 1, 2, 4, and 8, being $2^0$, $2^1$, $2^2$, $2^3$, respectively control four relays 24, 25, 26, and 27. The relay 24, when energized operates a two-position switch 28 corresponding to the number 1, which is the same in both systems, moving it from a contact 29 to a contact 30. The relay 25 similarly contacts two switches 31 and 32, the switch 31 moving from contact 33 to contact 34 when actuated by the energization of the relay 25, while the switch 32 simultaneously moves from contact 35 to contact 36. The relay 26 controls four switches 37, 38, 39, and 40, moving between their respective pairs of contacts 41, 42 and 43, 44 and 45, 46 and 47, 48. The relay 27 controls two switches 50 and 51 with pairs of contacts 52, 53 and 54, 55.

The contact 29 is connected to the switch 31 by a lead 56, while the contact 30 is connected to the switch 32 by a lead 57.

The contact 33 is connected to the switch 37 by a lead 58, and the contact 34 is connected to the switch 38 by a lead 59. The contact 35 is connected by a lead 60 to the switch 39, while the contact 36 in connected by a lead 61 to the switch 40.

The contact 41 is connected by a lead 62 to the switch 50, while the contact 42 is the output terminal for the decimal number 4. The contact 43 is the output terminal for decimal number 2, and the contact 44 is the output terminal for the decimal number 6. The contact 45 is connected by a lead 63 to the switch 51, while the contact 46 is the output terminal for the decimal number 5. The contact 47 is the output terminal for the decimal number 3 and the contact 48 is the output terminal for the decimal number 7.

The contacts 52, 53, 54, and 55 are respectively the output terminals for the decimal numbers 0, 8, 1, and 9.

Thus, when no relay is energized the electricity from E goes via switch 28, contact 29, lead 56, switch 31, contact 33, lead 58, switch 37, contact 41, lead 61, and switch 50 to the zero output terminal 52.

Similarly, when only the 1 relay 24 is energized, the electric path is by the switch 28, contact 30, lead 57, switch 32, contact 35, lead 60, switch 39, contact 45, lead 63, and switch 51 to the 1 output terminal 54.

If both the 1 relay 24 and the 4 relay are energized, and no other relay is energized, the path is by the switch 28, contact 30, lead 57, switch 32, contact 35, lead 60, and switch 39 to the 5 output terminal 46. Similarly, every binary number is translated to its decimal equivalent.

This same simple translation may be accomplished by a network of solid-state components performing the same switching functions as the relays in FIG. 2. Or a digital computer may be programmed to perform the arithmetic steps to convert from one number to another. If more complex number systems of binary coded decimal numbers, or of binary coded base-32 numbers should require an impractical quantity of relays or solid-state components for translation to straight binary, the translation is preferably performed with computer techniques.

If for any reason it is not desirable or convenient to include dials, push buttons or some other such arrangement on the vending machine for entering the memorized combination, one may use special cards or keys, which the owner pre-sets to his code-number before inserting the card or key into the vending machine. Such cards or keys also contain the machine-readable number, and once the device is set and entered, the entire purchase takes place in a fraction of a second. The vending machine in this case preferably resets the device to some ambiguous setting before returning it to the owner.

Other outstanding advantages of the security system outlined herein are that purchases may be recorded on tape within the station without an elaborate communication network. These tapes may be processed periodically at some central location for preparing monthly billing. Also, my new system involves relatively straight-forward and inexpensive hardware within a vending machine, making it a reasonable consideration for inclusion into vending machines suitable for fare collection.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A vending machine for credit purchasing employing a credit card having a scrambled non-visually-decipherable first code number thereon, including in combination:
    means for reading and unscrambling said first code number,
    means for manually introducing a memorized second code number into said machine,
    means for comparing said first and second code numbers,
    means enabling delivery of an article from said machine when said code numbers coincide, and
    means for recording billing confirmation from said credit card.
2. The machine of claim 1 wherein said means for comparing comprises a thirty-two digit system and five binary bits for each digit place thereof.
3. A vending machine for credit purchasing for use with a credit card having a non-visual coded number thereon including in combination:
    means for manually setting a memorized code number,
    means for reading the coded number on said credit card,
    means for recording the coded number of said credit card for later billing,
    means for comparing the two numbers to determine whether they bear a predetermined relationship to each other, and
    means for dispensing a purchased article when said predetermined relationship is found to exist.
4. The machine of claim 3 wherein said coded number is magnetically coded on said credit card and said means for reading is magnetic decoding means.
5. The machine of claim 3 wherein said coded number is scrambled on the credit card and said machine includes unscrambling means.
6. A credit purchasing system, comprising
    a credit card having a scrambled non-visually-decipherable first code number thereon,
    machine means for reading and unscrambling said first code number,
    means for manually introducing a memorized second code number into said machine,
    means for comparing said first and second code numbers,
    means enabling delivery of an article from said machine when said code numbers coincide, and
    means for recording billing confirmation from said credit card.
7. A method of credit purchasing from a vending machine for use with a credit card having a non-visual coded number thereon including in combination:
    manually setting on said machine a memorized code number,
    reading through said machine the coded number on said credit card,
    recording the coded number of said credit card for later billing,
    mechanically comparing the two numbers to determine whether they bear a predetermined relationship to each other, and
    mechanically dispensing a purchased article when said predetermined relationship is found to exist.
8. A method of personal identification by machine, for use with a card having a non-visual coded number thereon including in combination:
    manually setting on said machine a memorized code number,
    reading through said machine the coded number on said credit card,
    mechanically comparing the two numbers to determine whether they bear a predetermined relationship to each other, and mechanically indicating identification when said predetermined relationship is found to exist.

9. A machine for identifying a user employing a card having a scrambled non-visually-decipherable first code number thereon, including in combination:
  means for reading and unscrambling said first code number,
  means for manually introducing a memorized second code number into said machine,
  means for comparing said first and second code numbers, and
  means certifying the user when said code numbers coincide.

10. A machine for identifying the holder of a card having a non-visual coded number thereon including in combination:
  means for manually setting a memorized code number,
  means for reading the coded number on said credit card,
  means for comparing the two numbers to determine whether they bear a predetermined relationship to each other, and
  means for indicating when said predetermined relationship is found to exist.

References Cited
UNITED STATES PATENTS

| | | | |
|---|---|---|---|
| 3,039,582 | 6/1962 | Simjian | 194—4 |
| 3,061,143 | 10/1962 | Simjian | 221—2 |
| 3,110,540 | 11/1963 | Simjian | 346—22 |
| 3,173,742 | 3/1965 | Simjian | 346—22 |
| 3,184,714 | 5/1965 | Brown et al. | 340—149 |
| 3,221,926 | 12/1965 | Winiger | 221—2 |
| 3,302,828 | 2/1967 | Gomez et al. | 221—2 |

SAMUEL F. COLEMAN, *Primary Examiner.*

Notice of Adverse Decision in Interference

In Interference No. 97,706 involving Patent No. 3,401,830, H. A. Mathews, VENDING MACHINE FOR CREDIT CARD PURCHASING, final judgment adverse to the patentee was rendered Jan. 24, 1974, as to claims 1, 3, 5, 6, 7, 8, 9 and 10.

[*Official Gazette July 2, 1974.*]